United States Patent [19]

Zanier et al.

[11] Patent Number: 4,766,674
[45] Date of Patent: Aug. 30, 1988

[54] SENSING DEVICE FOR AN INDEPENDENT LINEAR-MAGNITUDE MEASUREMENT APPARATUS

[75] Inventors: Adriano Zanier, Prilly; Charles-Henri Zufferey, Lausanne, both of Switzerland

[73] Assignee: Tesa A.A., Renens, Switzerland

[21] Appl. No.: 32,170

[22] Filed: Mar. 30, 1987

[30] Foreign Application Priority Data

Apr. 30, 1986 [CH] Switzerland ............... 01768/86

[51] Int. Cl.⁴ .............................................. G01B 7/02
[52] U.S. Cl. ..................................... 33/503; 33/1 M; 33/542; 33/558
[58] Field of Search ............. 33/172 D, 172 E, 178 E, 33/503, 504, 505, 542, 558, 1 M

[56] References Cited

U.S. PATENT DOCUMENTS

| | | | |
|---|---|---|---|
| 3,241,243 | 3/1966 | Speer | 33/503 |
| 3,481,042 | 12/1969 | Lemelson | 33/505 |
| 3,750,295 | 8/1973 | Nordmann et al. | 33/503 |
| 3,840,994 | 10/1974 | Izumi et al. | 33/503 |
| 4,562,648 | 1/1986 | Danielli | 33/542 |

Primary Examiner—William D. Martin, Jr.
Attorney, Agent, or Firm—Anthony J. Casella; Gerald E. Hespos

[57] ABSTRACT

The device is intended for an independent measuring apparatus which can be displaced on a measurement plane on which a part to be measured is immobilized. This device comprises a slide which is displaceable along a slideway of the apparatus perpendicular to the measurement plane, a carriage mounted for displacement in said same direction against opposing forces of two springs intended for the applying of a sensing force, and a support bearing a probe which is mounted for displacement on the carriage in a direction perpendicular to that of the vertical slideway. Upon the search for the point of regression of the probe which is necessary for the detection of the two diametrically opposite points of a bore of the part to be measured, the entire apparatus is immobile on the measurement plane and only the feeler support is displaced on the carriage. Automation of the search for the point of regression is also shown.

6 Claims, 3 Drawing Sheets

U.S. Patent  Aug. 30, 1988  Sheet 1 of 3  4,766,674
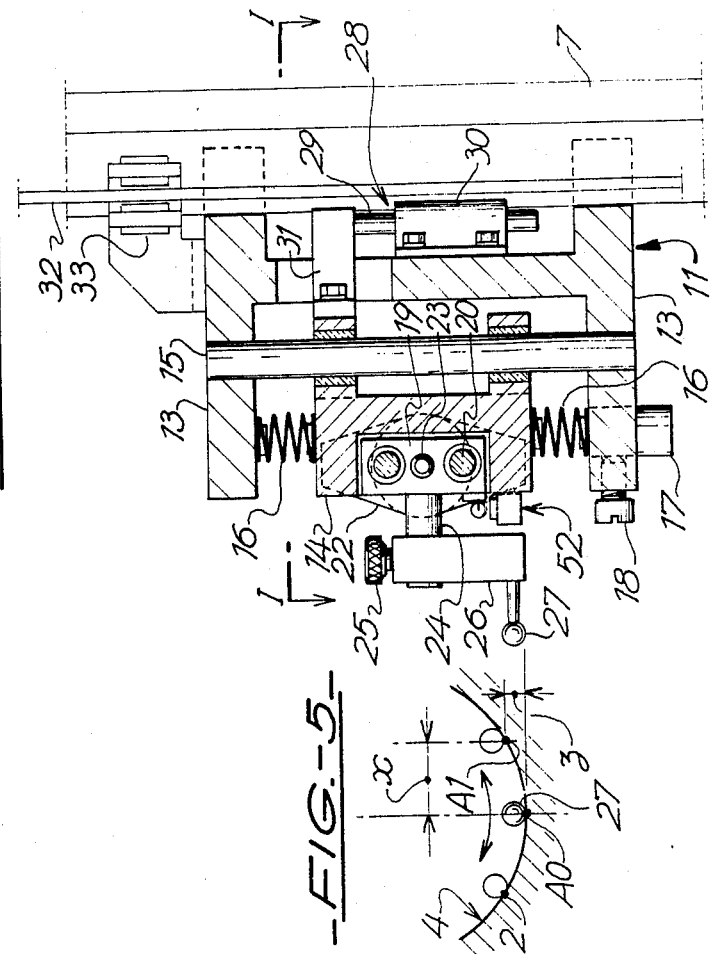
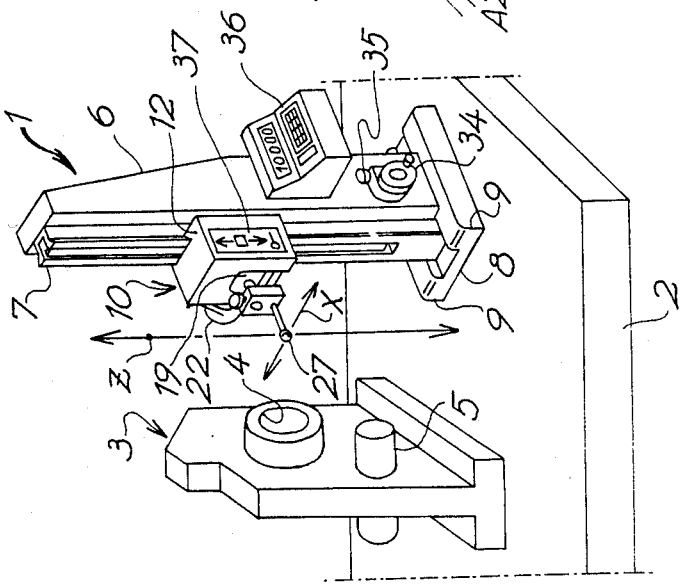

SENSING DEVICE FOR AN INDEPENDENT LINEAR-MAGNITUDE MEASUREMENT APPARATUS

A sensing device for an independent linear magnitude measurement apparatus intended for measuring, with reference to a plane and along a measurement axis perpendicular to said plane, a part which is immobilized with respect to said plane, and having a slide intended to be mounted for movement along a linear slideway of the measurement apparatus which is displaceable on the plane and oriented in the direction of the measurement axis, a carriage displaceable by translation in said same direction on the slide and against the opposing forces of two springs holding it in position of rest between two fixed supports of the slide, a sensor with measurement feeler three-dimensionally coupled to the displacements of the carriage on the slide and intended to sense under a selected sensing force an element of the part to be measured by displacement of the carriage against the force of reaction of one of the two springs, a detector for the relative displacements of the carriage with respect to the slide adapted to deliver signals which are representative of these displacements in direction and amplitude and indicative of variations of the sensing force, and an electronic circuit connected to the detector and adapted to control a pre-established process of acquisition of the measurement and detection of the point of regression of the sensor upon the sensing of diametrically opposite points of a shaft or of a bore of the part to be measured as a function of the variations in relative amplitude of the signals of the detector, and comprising a signal panel of said variations.

A known sensing device of this type is used on a measuring apparatus referring to a measurement plane formed of a table and the slideway of which is implanted on a base having a flat support surface in which there is integrated an air-cushion supporting device intended to facilitate its displacements on the table. The vertical displacement of the slide of the sensing device along the slideway of the apparatus is obtained by the actuation of a knurled wheel with crank for rapid advance and by a knurled knob for fine adjustment. The sensor of the sensing device is fastened on the carriage and the panel signalling the variations of the signal of the detector is formed of a galvanometer the needle of which moves over a zoned and graduated scale, making it possible to quantitatively visualize these variations. This panel furthermore has a pilot lamp which confirms the acquisition of the dimension of the sensed element of the part and which is at the same time descriptive, by the lighting-up thereof, of the reaching or exceeding of the sensing force selected for this acquisition.

Upon the application of the process of measuring the diameter of a shaft or of a bore of a part mounted and immobilized on the table, the acquisition of the dimension of the two diametrically opposite points of their diameter requires the prior search for the precise position of each of these two points in the vertical plane of measurement on the curved surface of these elements. This search is effected, for instance, with respect to the bottom point of the diameter of a bore first of all by displacement on an air cushion of the column on the table and by rapid descent of the slide by means of the wheel until applying, by sight, the feeler of the sensor against the cylindrical surface of the bore in the vicinity of the low point in question. Thereupon, by actuation of the fine adjustment knob, a sufficient sensing force is applied by the sensor on the part, under the visual control of the position of the needle on the graduated scale of the galvanometer. The operator then moves the slide and its base laterally on the table in order to seek the low point of the diameter of the bore while checking the movement of the needle of the galvanometer which, upon the passage of the feeler over this low point, starts a movement of regression corresponding to the regression of the sensor on the low part of the cylindrical surface of said bore. At that time, the position of the point of regression of the needle on the graduated and zoned scale indicates whether the sensing force is still sufficient and the operator makes the correction, if necessary, by means of the fine adjustment knob. Finally, once the position of the low point of the bore has been defined by this means of controlling the point of regression of the sensor, the machine and the part which are immobilized on the measurement table must no longer be displaced until the release of the measurement engagement. The latter is obtained by an increase in actuation of the fine adjustment knob so as to increase the sensing force up to a selected pre-established value, the reaching of which is confirmed by the pilot lamp.

This process of taking a measurement, carried out under the control of the signal panel and informed by the electronic circuit connected to the detector of the displacements of the carriage on the slide of the sensor device is simple and reliable. It permits an easy and rapid verification of the values defining the position of the point of regression of the sensor and the relative position of the latter with respect to the slide in the direction of the measurement axis.

The object of the invention is to increase the performance of an independent measuring apparatus equipped with a sensing device of the aforementioned type upon the taking of measurements of diametrically opposite points of a shaft or a bore.

For this purpose, the sensing device of the invention is characterized by the fact that the sensor is fastened on a support which is mounted for displacement on the carriage by translation in the measurement plane and in a direction perpendicular to that of the displacements of the carriage with respect to the slide, and this support has a device for controlling its displacements and locking it on the carriage.

In this way, in the application of the procedure of search for the point of regression of the sensor, the operator, once this point of regression has been passed and after the sensing force has possibly been corrected being guided for this by the indications of the signal panel, need now merely actuate the device for controlling the displacements of the support of the sensor on the carriage, leaving the base of the slideway and the part locked on the measurement table until this support is also immobilized at the point sought, under the control of the indications supplied by the signal panel.

The additional lateral mobility of the sensor with respect to the carriage, which mobility is oriented in a direction perpendicular to the displacements of the latter in the direction of the measurement axis, in no way affects the precision of the measurements made along said axis and influences the detector in exactly the same manner as the slideway and its base did upon this operation.

In order to make the maneuvers for the searching and controlling of the point of regression even easier, the inventive concept is characterized by the fact that the sensor is fastened on a support which is mounted for displacement on the carriage by translation in the measurement plane and in a direction perpendicular to that of the displacements of the carriage with respect to the slide, by the fact that this support comprises a device for controlling its displacements and locking it on the carriage, and by the fact that the panel signalling the variations of the signal coming from the detector has four geometrical symbols distinguished by their shape, their orientation and/or their color and the lighting of which, controlled by the electronic circuit connected to the detector, is indicative in the case of the first two of them of the direction of displacement of the carriage on the slide in the direction of the coordinate axis, for the third of the arrival of the said carriage in a predetermined zone of its displacements in each of the two directions thereof with respect to its position of rest, the size of this zone being contained within a range of values of the sensing force selected for the search for the point of regression, and in the case of the fourth (51) of the arrival of this same carriage in each of the two directions of its displacements at a predetermined position of release of the measurement engagement, outside the said zone and corresponding to the sensing force selected for this release.

As will be shown further below in the following description, the device for controlling the displacements and immobilizing the support of the carriage can be developed in various manners, with a particular effect and particular advantage in each of them.

The accompanying drawing shows, by way of example, a measurement apparatus equipped with the object of the invention, one embodiment of said object, and a variant of an element of this embodiment.

FIG. 1 is an overall view of the measuring apparatus.

FIG. 2 is a profile view in partial axial section of the sensing device.

FIG. 5 is a diagram illustrating one phase of the measurement procedure applied.

Figure 3:
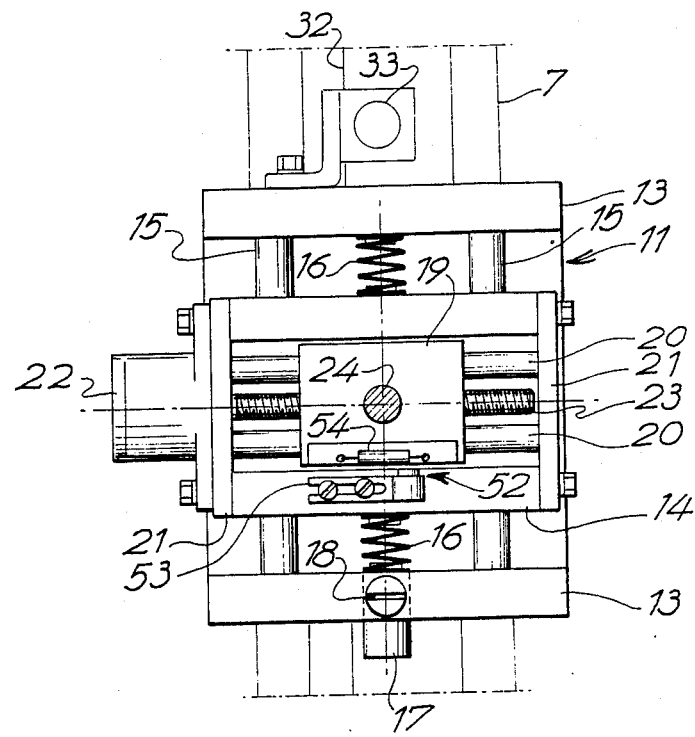
FIG. 3 is a front view of this device.

The measurement apparatus 1 shown in FIG. 1 is an independent magnitude measurement column of the type having a single measurement axis Z perpendicular to a measurement table 2 on which there is mounted a part 3 to be measured having a bore 4 and a shaft 5.

This column has a vertical frame 6 bearing a linear slideway 7 oriented in the direction of the measurement axis Z, the frame being implanted on a base 8 having a flat supporting surface perpendicular to the slideway 7 and having two lateral compartments 9 within which there is integrated an air-cushion support device intended to facilitate the displacements of the column on the table 2 upon the preliminary measures of approach to the plate 3 for the taking of a measurement.

The sensing device 10 of the invention is mounted on the slideway 7.

Figure 4:
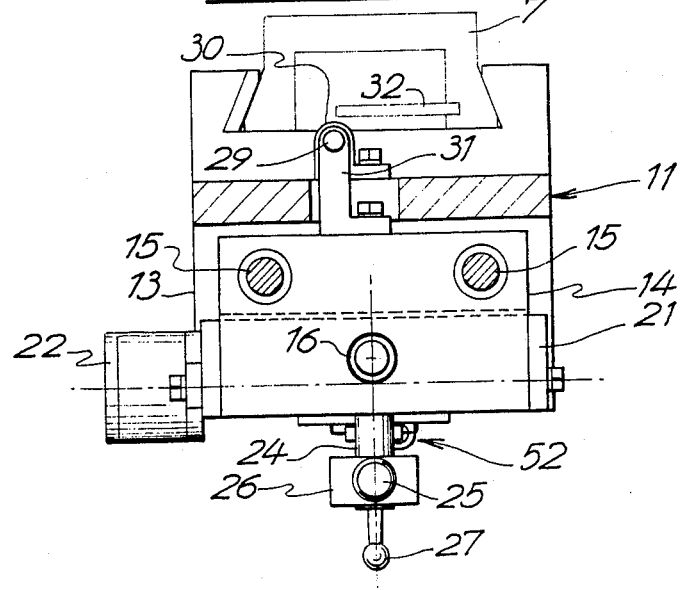
FIG. 4 is a top view, shown in section along the section line I—I of FIG. 1.

This sensing device, shown in detail in FIGS. 2, 3 and 4, comprises a slide 11 enclosed within a housing 12 which is visible only in FIG. 1 and mounted for movement by translation along the slideway 7. This slide 11 comprises a hollow portion in the shape of a U lying on its side, between the two horizontal arms 13 of which there is mounted a carriage 14 which is displaceable by translation in the vertical direction of the coordinate axis Z also and along two parallel cylindrical columns 15 implanted in the two arms 13.

The carriage 14 is held in position of rest between the two arms 13 of the slide by the opposing forces of two compression springs 16 mounted in opposition on opposite sides of this carriage and resting against the arms 13. The counterbalancing position of these two springs is made adjustable here to a certain extent by a movable support 17 which is engaged in a hole in an arm 13 and which can be locked in selected position by means of a set screw 18.

A counterweight (not shown) can be added to this balancing system in order to compensate for the inertia of the masses suspended between the two springs, this for the purpose of avoiding any possible oscillation at the hard point of rest. However, such a counterweight is not indispensible in order to achieve the purpose in view.

The carriage 14, thus mounted on the slide 13, has a parallelepiped cavity within which there is mounted a support 19 which is displaceable by translation in the vertical plane of measurement and in a direction X (FIG. 1) perpendicular to that of the displacements of the carriage with respect to the slide, that is to say, in fact, perpendicular to the measurement axis Z.

For this purpose, the support 19 is mounted for sliding along two horizontal cylindrical slideways 20 implanted in two side walls 21 of the carriage 14. This support 19 has a device for the control of its displacements and its locking along the slideways 20 which device is formed here by a stepping electric motor 22 with two directions of rotation which drives a screw 23 in engagement in a threaded hole passing through said support, this motor being fastened against a side wall 21 of the carriage 14.

The free front wall of the support 19 has a horizontal extension arm 24 on which a removable sensor 26 with spherical measurement probe 27 is fastened by a lock screw 25.

In the rear part of the slide 13, opposite the sensor 26, there is installed a detector of the relative displacements of the carriage 14 with respect to the slide 13, which is capable of delivering signals representing these displacements in direction and magnitude, and which is formed here by a resistive pick-up 28 the wiper 29 of which is fastened to the carriage 14 via an arm 31 and the body 30 of which having the track is fastened to the slide 13, the signals given off by this detector being moreover also indicative of the variations of the sensing force applied by the probe of the sensor and by compressive effect of one of the two springs 16 on the part to be measured during the process of taking the measurement.

With regard to the detection of the displacements of the slide 13 along the vertical slideway 7 of the column in the direction of the measurement axis Z, which is not directly related to the problem to which the invention refers, an example is given here in order to facilitate an understanding of the measurement process applied by means of such a column.

In order to assure this detection, the slide 13 of the sensing device is associated with a linear detection device having a member which is sensitive to the displacements of this slide along the slideway 7, which member is formed by an optoelectronic incremental system of customary type, formed of a graduated rule 32 fastened in position parallel to the slideway 7 and on the interior of the latter and of an optoelectronic pick-up 33 constituting the sensitive member of this system, fastened to the said slide 13.

The displacement of the slide 13 of the sensing device along the slideway 7 of the column is obtained, on the one hand, for rapid advance, by means of an operating wheel 34 (FIG. 1) and, on the other hand, for fine adjustment by means of a knob 35 for worm drive of the wheel and this via a transmission system of the endless belt type, not shown in the drawing, which is actuated by the wheel 34.

The measurement column furthermore comprises, fastened against the frame 6, a control console 36 containing an electronic circuit connected to the detectors 28 and 33 of the sensing device and provided, with regard directly to the invention, in order to control a pre-established process for the acquisition of the measurement and detection of the point of regression of the sensor 26 upon the sensing of the diametrically opposite points of the shaft 5 or of the bore 4 of the part 3 to be measured as a function of the variations of the relative amplitude of the signals coming from the detector 28 of the sensing device.

Figure 6:
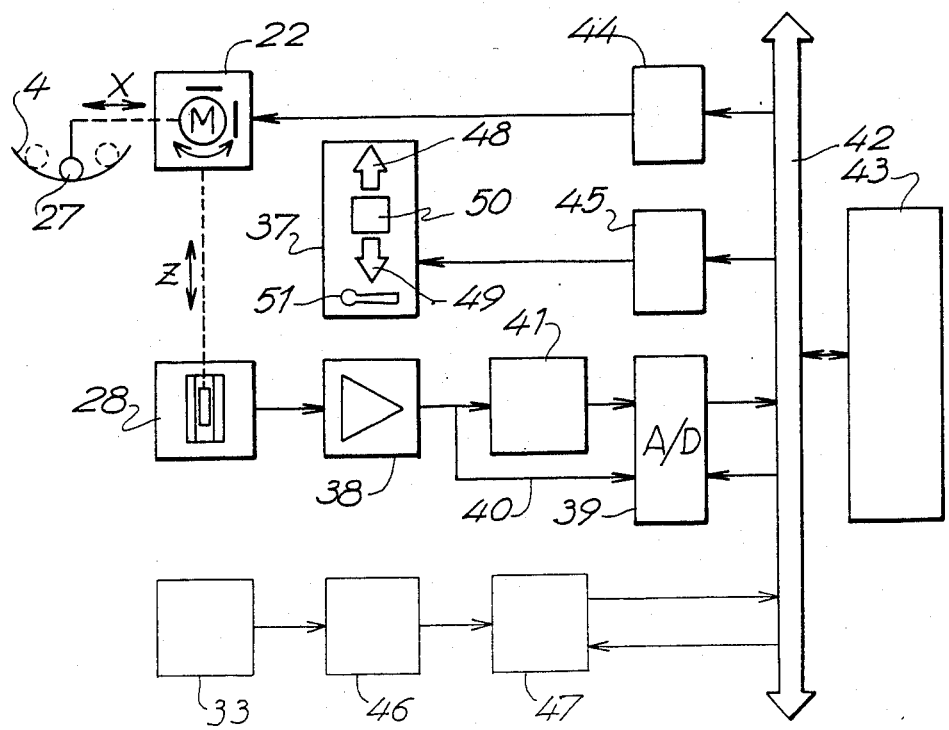
FIG. 6 is a functional diagram of its electronic control circuit.

This electronic circuit, one embodiment of which is given in the functional diagram of FIG. 6, comprises, connected to the resistive pick-up 28 of the sensing device, an amplifier 38 for the signals emitted by this pick-up, the analog output of which is connected to an analog-digital converter 39, on the one hand, directly by a connection 40 and, on the other hand, via a regression detector 41. The converter 39 is connected to a processor 42 programmed as a function of the measurement process selected and informed by a calculator 43 in digital terms resulting from the processing of the signals coming from the converter 39.

In this first branch of the electronic control circuit, the regression detector 41 is provided to deliver a signal indicative, in the detection of the variations of the signals coming from the pick-up 28, of the passage of these signals through a maximum or minimum value of their amplitude.

On the one hand, the motor 22 and, on the other hand, the signal panel 37 are then connected to the processor 42 via latches 44 and 41.

In this diagram there are also shown in dashed line the mechanical connections between the measurement feeler 27 of the sensor 26 and the motor 22 which controls its displacements in the two directions X perpendicular to that of the measurement axis Z and between the support 14 on which this motor 22 is fastened and the wiper of the resistive pick-up 28 which is urged in the direction of said measurement axis Z during the path of exploration of the cylindrical surface of the bore 4 by the measurement feeler.

This electronic circuit feeds both the signal elements of the panel 37 and the electric stepping motor 22.

With regard to the motor 22, the electronic circuit is programmed to constitute a circuit for the piloting of the displacements of the support 14 on the box 13 by dependence on the variations of the signal coming from the detector 28 in order to bring this support to and stop it in a position for which the relative amplitude of said signal passes through a minimum or maximum value depending on the process for the acquisition of the dimension of the diametrically opposite points of the shaft 5 or of the bore 4, and indicative of the position of the point of regression of the probe, this value being detected by the regression detector 41.

Supplementing this electronic circuit, which is specific to the invention, there are also shown in fine line the connections between the optoelectronic incremental pick-up 33 and the processor 42 via a signal amplifier 46 and a high-low counter 47, which provide the calculator 43 with the data necessary for the calculation of the value Z of an element of the part to be measured by the integration in this calculation of the difference in position between the feeler of the sensor and this optoelectronic pick-up which is given by the resistive pick-up 28.

The signal panel 37 bears four geometrical symbols 48, 49, 50 and 51 which are distinguished by their shapes, their directions and their colors and the illuminating of which, controlled by the processor 42, is indicative for each of them of a special phase of the measurement engagement process depending on the variations in the sensing force which, in its turn, is dependent on the variations of the amplitude of the signal coming from the pick-up 28, in both directions of displacement of the carriage 14 on both sides of its position of rest.

These symbols have two arrows 48 and 49 pointing in opposite directions which are of the same color and arranged one above and the other below a third rectangular symbol 50 of a different color and below which there is placed a fourth symbol in the form of a horizontally lying bowling pin, also of a different color, symbolizing the measurement feeler of the sensor.

The illuminating of the first two arrow-shaped symbols 48 and 49 is indicative of the direction of displacement of the carriage 14 on the slide 13 in the direction of the Z measurement coordinate axis.

The illuminating of the third symbol of rectangular shape 50 is indicative of the arrival of the carriage in a predetermined zone of its displacements in each of the two directions thereof with respect to its position of rest. The size of this zone corresponds to the size of a range of values of the sensing force which are selected and used for the finding of the point of regression without triggering the measurement engagement. The width of this search zone is represented in FIG. 5 by the dimension z, separating the two positions A0-A1 and A0-A2 respectively, of the feeler of the probe 27 in the direction of the measurement axis Z and which corresponds to a displacement x of this feeler between these two positions in the direction X perpendicular to this measurement axis Z during the exploring of the lower part of the cylindrical surface of the bore 4.

The illuminating of the fourth symbol 51 representing the measurement feeler is indicative of the arrival of the carriage, in each of the two directions of its displacement with respect to its position of rest, at a predetermined position for triggering of the measurement engagement and which corresponds to a sensing force greather than those obtained within the said range.

In order to still further call the attention of the operator during the first phase of the measurement process which consists in adjusting the sensing force applied by the feeler of the sensor in the vicinity of the bottom or top point of a bore or of a shaft to be measured, the first two symbols 48 and 49 are illuminated by flashing light for a position of the carriage located outside of the zone of search of the point of regression and which is indicative of insufficient or excessive sensing force, and the frequency of this flashing of the light is proportional to the decrease in the error of said force, all of this being obviously obtained by the programming of the processor 42.

In this way and by its difference in concept from the graduated scale of the dial of a galvanometer, as is of common use, this signal panel 37 eliminates any risk of error in reading and dispenses from the necessity of carefully following the displacements of a needle on a graduated scale. Furthermore, the effect of the illuminating of the four clearly different symbols frees the operator from any hesitation as to the interpretation of the phenomena which they indicate and which he can thus easily control.

Of course, this does not exclude the use of a dial with graudated scale in order to achieve the purpose of the invention.

The embodiment of the object of the invention which has just been described adds the advantage of the automating of the last phase of search for the point of regression of the sensor to the advantage of having to displace only the feeler support on the carriage during this search. In fact, the operator, after having adjusted the sensing force and having passed the point of regression in order to assure himself of the sufficiency of said force merely has to start the automatic search cycle for said point of regression by means, for instance, of a push button located on the control console 36 of the machine and to check the signal panel 37 which by the lighting-up of the rectangular symbol 50 and the extinguishing of the two arrows 48 and 49 indicates to him that the sensor is immobilized at the point sought. It is then merely necessary to act on the fine adjustment knob 35 or the handle 34 in order to increase the sensing force until reaching the value for the starting of the making of the measurement, the obtaining of which is indicated to him by the illuminating of the fourth symbol 51. It should be noted here that at the end of each measurement process of this type, the support 19 is no longer in its initial starting position along the slideways 20, except of course in the exceptional undesired case that the operator locks the column on the measurement table precisely at the point of regression A0 of the probe 27 of the sensor.

Therefore, before starting a new measurement process it is necessary to return the support 19 to its initial starting position, for instance to total mid-course, as shown in FIGS. 3 and 4, in order not to limit the course available for the next automatic search in one direction or the other.

This return to the initial position can be effected in various ways, in particular by restitution in the servocircuit of the motor 22 of the memorized value of the displacement of the support 19 from its initial starting position to its position of detection of the point of regression, the restitution being based, for instance, on the number of steps effected by this stepping motor in the direction along of this displacement (dimension x in FIG. 5) or on the speed of displacement of the wiper 29 on the track of the resistive pick-up 28.

Another means is shown in the drawing. It consists of a HALL effect pick-up 52 the magnet of which is fastened on a support 53 which is mounted in adjustable position on the carriage 14 and the sensitive element 54 of which is fastened on the support 19, this magnet and this sensitive element being located opposite each other. At the end of the measurement process, the feeding of the motor 22 is controlled by this pick-up in order to return the support 19 to its initial starting position pre-adjusted by the positioning of the magnet on the carriage 14.

Figure 7:
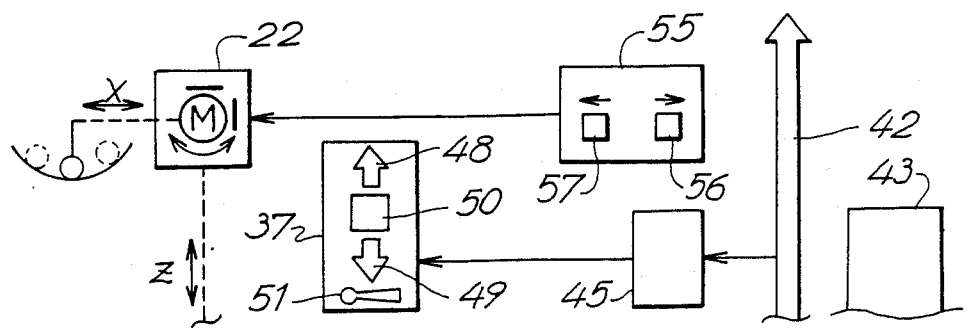
FIG. 7 is a partial functional diagram illustrating the variant.

In a variant of the device for controlling the displacements of and locking the support 19, which device is shown diagrammatically in FIG. 7, the motor 22 is no longer controlled by the electronic circuit but rather directly by a push button device 55 having two right-left control buttons 56 and 57 the respective actuating of which releases a number of steps of advance in the direction selected which is proportional to the time of actuation and the stopping of which is caused by the release of these buttons.

In this simplified and economical variant, it is the operator who seeks the point of regression by actuating the push-button device and guiding himself on the signals on the panel 37. By the same means, and before starting a new measuring process, the operator can and must return the support 19 to its initial starting position on the carriage 14, by sight and without the aid of an additional device such as the above-mentioned HALL effect pick-up.

In a variant, which has not been shown but which is easy to imagine and is of even greater economy and great simplicity, the drive motor 22 of the screw 23 is replaced by a crank intended to be actuated by the operator. In fact, any system for controlling the displacement and locking can be employed here, whether manual or motorized, such as, for instance, a gear-rack drive, without going beyond the scope of the invention and without thereby losing the essential advantage of the immobility of the column on the measurement table in the last phase of the search for the point of regression of the probe.

The invention could be applied with even greater benefit to columns for the measurement of heights which are not equipped with air-cushion supporting devices.

It is also applicable to height measurement columns on which the pick-up for the displacements of the probe device along the slide 7 is of a type other than the opto-electronic incremental pick-up mentioned above and is located elsewhere than on the slide 11, this pick-up not entering into consideration within the strict scope of the invention.

Finally, the invention is obviously applicable to any independent apparatus for the measurement of linear magnitudes other than the height measurement column given by way of example and the reference plane of which is oblique.

We claim:

1. A sensing device for an independent linear magnitude measurement apparatus intended for measuring, with reference to a plane and along a measurement axis perpendicular to said plane, a part which is immobilized with respect to said plane, and having a slide intended to be mounted for movement along a linear slideway of the measurement apparatus which is displaceable on the plane and oriented in the direction of the measurement axis, a carriage displaceable by translation in said same direction on the slide and against the opposing forces of two springs holding it in a position of rest between two fixed supports of the slide, a sensor with a measurement feeler mounted to the carriage on the slide and operative to sense under a selected sensing force an element of the part to be measured by displacement of the carriage against the force of retention of one of the two springs, a detector for the relative displacements of the carriage with respect to the slide adapted to deliver signals which are representative of these displacements in direction and amplitude and indicative of variations of the sensing force, and an electronic circuit connected to the detector and adapted to control a pre-established process of acquisition of the measurement and detection of the point of regression of the sensor upon the sensing of diametrically opposite points of a shaft or of a bore of the part to be measured as a function of the variations in relative amplitude of the signals of the detector, and comprising a panel signalling said variations, characterized by the fact that the sensor (26) is fastened on a support (19) which is mounted for displacement on the carriage (14) by translation in the measurement plane and in a direction (X) perpendicular to that of the displacements of the carriage with respect to the slide (13), and said support (19) has a device (22, 23) for controlling its displacements and locking it on the carriage.

2. A device according to claim 1, characterized by the fact that the device for controlling the displacements of the support (19) on the carriage (14) comprises a motor (22) for driving said support in both directions of its displacement.

3. A device according to claim 2, characterized by the fact that the device for controlling the displacements of the support comprises a push-button device (55) for controlling the running and stopping of the motor (22) of the support in both directions of displacement of the latter.

4. A device according to claim 2, characterized by the fact that the motor of the device for the support is a stepping motor fed by a circuit (38 . . . 44) for the controlling of the displacements of said support in accordance with the variations of the signal coming from the detector (28) in order to bring said support to and stop it in a position for which the relative amplitude of said signal passes through a minimum or maximum value depending on the procedure of acquisition of the measurement of a shaft or of a bore and indicating the position of the point of regression (AO) of the feeler (27) of the sensor (26).

5. A sensing device for an independent linear magnitude measurement apparatus intended for measuring, with reference to a plane and along a measurement axis perpendicular to said plane, a part which is immobilized with respect to said plane, and having a slide intended to be mounted for movement along a linear slideway of the measurement apparatus which is displaceable on the plane and oriented in the direction of the measurement axis, a carriage displaceable by translation in this same direction on the slide and against the opposing forces of two springs holding it in a position of rest between two fixed supports of the slide, a sensor with a measurement feeler mounted to the carriage on the slide and operative to sense under a selected sensing force an element of the part to be measured by displacement of the carriage against the force of reaction of one of the two springs, a detector for the relative displacements of the carriage with respect to the slide adapted to deliver signals which are representative of these displacements in direction and amplitude and indicative of the variations of the sensing force, and an electronic circuit connected to the detector and adapted to control a pre-established process of acquisition of the measurement and detection of the point of regression of the sensor upon the sensing of diametrically opposite points of a shaft or of a bore of the part to be measured as a function of the variations in relative amplitude of the signals of the detector, and comprising a panel signalling said variations, characterized by the fact that the sensor (26) is fastened on a support (19) which is mounted for displacement on the carriage (14) by translation in the measurement plane and in a direction (X) perpendicular to that of the displacements of the carriage with respect to the slide (13), and said support (19) has a device (22, 23) for controlling its displacements and locking it on the carriage, and the panel (37) signalling variations of the signal coming from the detector (28) has four geometrical symbols (48, 49, 50, 51) distinct from one another and each being operative to be illuminated, the illuminating of which, controlled by the electronic circuit connected to the detector, is indicative in the case of the first two of them (48, 49) of the direction of displacement of the carriage (14) on the slide (13) in the direction of the measurement axis, for the third (50) of the arrival of the said carriage in a predetermined zone of its displacements in each of the two directions thereof with respect to its position of rest, the size of said zone being contained within a range of values of the sensing force selected for the search for the point of regression, and in the case of the fourth (51) of the arrival of this same carriage in each of the two directions of its displacements at a predetermined position of release of the measurement engagement, outside of the said zone and corresponding to the sensing force selected for this release.

6. A device according to claim 5, characterized by the fact that the first two geometrical symbols (48, 49) are illuminated by flashing in the case of a position of the carriage (14) which is located outside of the zone of search of the point of regression and significant of insufficient or excessive sensing force, and by the fact that the frequency of this flashing is proportional to the decrease of the error of said force.

* * * * *